United States Patent
Guen

(10) Patent No.: US 10,276,852 B2
(45) Date of Patent: Apr. 30, 2019

(54) RECHARGEABLE BATTERY

(71) Applicant: SAMSUNG SDI CO., LTD., Yongin-si, Gyeonggi-do (KR)

(72) Inventor: Min-Hyung Guen, Yongin-si (KR)

(73) Assignee: Samsung SDI Co., Ltd., Yongin-si (KR)

(*) Notice: Subject to any disclaimer, the term of this patent is extended or adjusted under 35 U.S.C. 154(b) by 171 days.

(21) Appl. No.: 15/164,770

(22) Filed: May 25, 2016

(65) Prior Publication Data
US 2016/0351940 A1 Dec. 1, 2016

(30) Foreign Application Priority Data

May 26, 2015 (KR) .......... 10-2015-0073084

(51) Int. Cl.
- H01M 2/26 (2006.01)
- H01M 10/0525 (2010.01)
- H01M 10/0587 (2010.01)
- H01M 2/04 (2006.01)

(52) U.S. Cl.
CPC ....... *H01M 2/263* (2013.01); *H01M 10/0525* (2013.01); *H01M 10/0587* (2013.01); *H01M 2/043* (2013.01); *H01M 2/0473* (2013.01); *H01M 2220/20* (2013.01); *Y02E 60/122* (2013.01); *Y02T 10/7011* (2013.01)

(58) Field of Classification Search
None
See application file for complete search history.

(56) References Cited

U.S. PATENT DOCUMENTS

2011/0151295 A1* 6/2011 Kim ............. H01M 2/263 429/94

FOREIGN PATENT DOCUMENTS

| KR | 10-2006-0033642 A | 4/2006 |
| KR | 10-2011-0069368 A | 6/2011 |

OTHER PUBLICATIONS

Kim (KR 10-2009-0126077) (a raw machine translation) (dated Jun. 23, 2011).*

* cited by examiner

Primary Examiner — Carmen V Lyles-Irving
(74) Attorney, Agent, or Firm — Lewis Roca Rothgerber Christie LLP

(57) ABSTRACT

A rechargeable battery includes a wound electrode assembly comprising a first electrode and a second electrode with a separator located between the first electrode and the second electrode, wherein the electrode assembly defines a rotation axis about which it has been wound and wherein lateral ends of the electrode assembly define rounded portions; a case accommodating the electrode assembly; and a cap assembly coupled to the case and including a first terminal and a second terminal, wherein the first electrode includes a plurality of first electrode tabs extending parallel with the rotation axis and protruding from lateral edges of the first electrode, wherein the second electrode includes a plurality of second electrode tabs extending parallel with the rotation axis and protruding from lateral edges of the second electrode, and wherein the first and second electrode tabs are separated from each other and located in the rounded portions.

11 Claims, 4 Drawing Sheets

RECHARGEABLE BATTERY

CROSS-REFERENCE TO RELATED APPLICATION

This application claims priority to and the benefit of Korean Patent Application No. 10-2015-0073084 filed in the Korean Intellectual Property Office on May 26, 2015, the entire contents of which are incorporated herein by reference.

BACKGROUND

1. Field

The present invention relates to a rechargeable battery.

2. Description of the Related Art

Unlike a primary battery which is incapable of being recharged, a secondary battery (rechargeable battery) can be repeatedly charged and discharged. A low-capacity rechargeable battery is used as a power supply for small electronic devices such as cellular phones, notebook computers, and camcorders, while a medium or high-capacity rechargeable battery is used as a power supply for driving motors in hybrid vehicles and the like.

In a jelly-roll type of rechargeable battery, an oval-shaped rechargeable battery is formed by spirally winding two electrodes while interposing a separator there between, and the electrode assembly is pressed such that the oval-shaped electrode assembly becomes more flat. In this case, the electrode assembly is pressed and thus a portion where an active material is coated is pressed.

When the electrode assembly is inserted into a prism-shaped can, the electrode assembly tends to swell due to a restoring force of a long side portion having a short diameter, and accordingly the electrode assembly swells and long side portions of the prism-shaped can that surround the outer side of the electrode assembly also swell. Accordingly, a short circuit may occur between the electrodes.

The above information disclosed in this Background section is only for enhancement of understanding of the background of the invention and therefore it may contain information that does not form the prior art that is already known in this country to a person of ordinary skill in the art.

SUMMARY

The present invention has been made in an effort to provide a rechargeable battery that can prevent swelling of an electrode assembly.

A rechargeable battery according to an exemplary embodiment of the present invention includes: an electrode assembly formed by spirally winding a first electrode and a second electrode with respect to a rotation axis, while interposing a separator between the first electrode and the second electrode and including rounded portions at lateral ends thereof; a case where the electrode assembly is installed; and a cap assembly combined to the case and including a first terminal and a second terminal, wherein the first electrode includes a plurality of first electrode tabs parallel with a direction of the rotation axis and protruded upward and downward, the second electrode includes a plurality of second electrode tabs parallel with the rotation axis and protruded upward and downward, and the first electrode tabs and the second electrode tabs are separated from each other and disposed in the rounded portions.

The first electrode tab and the second electrode tab may be rounded along the rounded portion.

The length of upward protruding of the first electrode tab may be longer than the length of downward protruding of the second electrode tab.

The first electrode may include a first protrusion tab protruded upward between the rotation axis of the electrode assembly and the first electrode tab.

The second electrode may include a second protrusion tab protruded upward between the rotation axis of the electrode assembly and the second electrode tab.

The first electrode tab may be electrically connected with the first terminal through a first current collecting member, the second electrode tab may be electrically connected with the second terminal through a second current collecting member, the first current collecting member and the second current collecting member may further include electrode combining portions that contact the first electrode tab and the second electrode tab, and the electrode combining portions may be bent according to the shapes of the first and second electrode tabs.

The first protrusion tab may be provided in plural, and the plurality of first protrusion tabs may be connected to each other by welding.

The second protrusion tab may be provided in plural, and the plurality of second protrusion tabs may be connected to each other by welding.

An electrode assembly according to an exemplary embodiment of the present invention includes: a first electrode including a first coated portion where an active material is coated and a plurality of first electrode tabs where an active material is not coated and protruded upward and downward in the outer side of the first coated portion; a second electrode including a second coated portion where an active material is coated and a plurality of second electrode tabs where an active material is not coated and protruded upward and downward in the outer side of the second coated portion; and a separator provided between the first electrode and the second electrode, wherein the first electrode, the separator, and the second electrode are spirally wound with respect to a rotation axis such that rounded portions are formed, and the first electrode tabs and the second electrode tabs are separated from each other and disposed in the rounded portion.

The first electrode tab and the second electrode tab may be rounded along the rounded portion of the electrode assembly.

An upward protruding length of the first and second electrode tabs may be longer than a downward protruding length of the first and second electrode tabs.

The first electrode may include a first protrusion tab protruded upward between the rotation axis and the first electrode tab.

The second electrode may include a second protrusion tab protruded upward between the rotation axis and the second electrode tab.

The length of the first protrusion tab may be shorter than the length of the first electrode tab.

The length of the second protrusion tab may be shorter than the length of the second electrode tab.

According to the exemplary embodiments of the present invention, electrode tabs protruded upward and downward are provided in lateral ends of an electrode assembly to fix the shape of the electrode assembly, thereby preventing swelling of the electrode assembly.

Further, a protrusion tab provided between the rotation axis and lateral electrodes fixes the electrode assembly in a short side direction, thereby preventing swelling of the electrode assembly.

DETAILED DESCRIPTION

Figure 1:
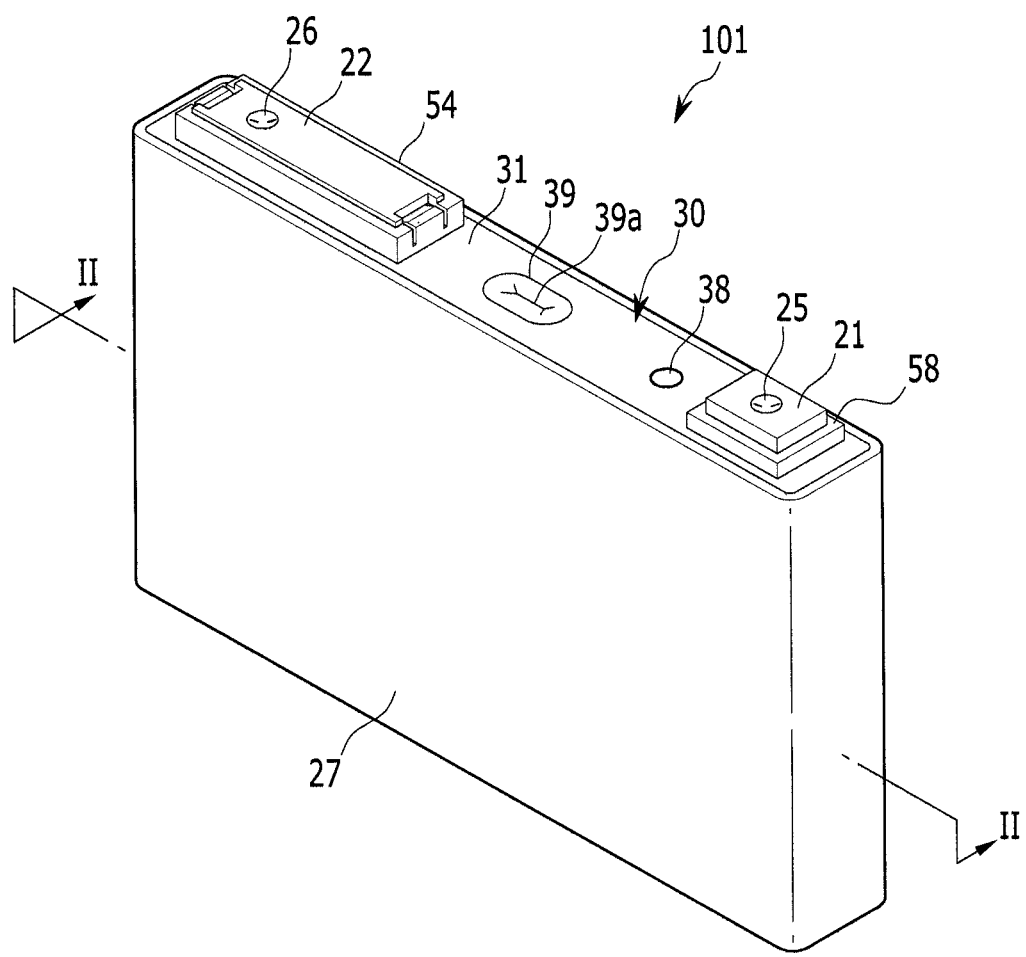
FIG. 1 is a perspective view of a rechargeable battery according to an exemplary embodiment of the present invention.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

The drawings and description are to be regarded as illustrative in nature and not restrictive. Like reference numerals designate like elements throughout the specification.

In the drawings, size and thickness of each element are arbitrarily illustrated for convenience of description, and the present invention is not necessarily limited to as illustrated in the drawings.

In addition, unless explicitly described to the contrary, the word "comprise" and variations such as "comprises" or "comprising" will be understood to imply the inclusion of stated elements but not the exclusion of any other elements.

FIG. 1 is a perspective view of a rechargeable battery according to an exemplary embodiment of the present invention.

Referring to FIG. 1, a rechargeable battery 101 according to an exemplary embodiment of the present invention includes a case 27 in which an electrode assembly 10 (refer to FIG. 3) is accommodated and a cap assembly 30 combined to the case 27.

The rechargeable battery 101 according to the exemplary embodiment of the present invention will be exemplarily described as a prism-shaped lithium ion rechargeable battery. However, the present invention is not limited thereto, and may be applied to various-shaped batteries such as a lithium polymer battery, a circular-shaped battery, and the like. Further, the rechargeable battery 101 according to the present exemplary embodiment may be a high-output prism-shaped battery, which can be formed as a battery used for starting a vehicle.

The case 27 is substantially formed in the shape of a cuboid, and has an opening formed in one side thereof. The case 27 may be made of a metal such as aluminum, stainless steel, and the like.

The cap assembly 30 includes a cap plate 31 covering the opening of the case 27, a first terminal 21 protruded to the outside of the cap plate 31 and electrically connected with a first electrode 11, and a second terminal 22 protruded to the outside of the cap plate 31 and electrically connected with the second electrode 12.

The cap plate 31 is formed in the shape of a plate, and is combined to the case 27. The first terminal 21 and the second terminal 22 protrude upward away from the cap plate 31.

A sealing cap 38 provided in an electrolyte injection opening 32 and a vent plate 39 that may be provided in a vent hole 34 may be provided in the cap plate 31. A notch 39a set to be opened at a predetermined pressure may be provided in the vent plate 39.

The first terminal 21 may be formed in the shape of a rectangular plate. A connection terminal 25 is formed in the shape of a column, and may be fixed to the first terminal 21 by welding wherein an upper end of the connection terminal 25 is within the first terminal 21. A connection member 58 that electrically connects the first terminal 21 and the cap plate 31 may be provided below the first terminal 21. Accordingly, the cap plate 31 and the case 27 may be electrically charged by the first electrode 11.

The second terminal 22 may be formed in the shape of a rectangular plate. A connection terminal 26 penetrates the cap plate 31 and the second terminal 22, and an upper end of the connection terminal 26 may be fixed to the second terminal 22. The connection terminal 26 is formed in the shape of a column, and may be fixed to the second terminal 22 by welding wherein an upper end of the connection terminal 26 is within the second terminal 22. An upper insulation member 54 that electrically insulates the second terminal 22 and the cap plate 31 may be provided between the second terminal 22 and the cap plate 31.

Figure 2:
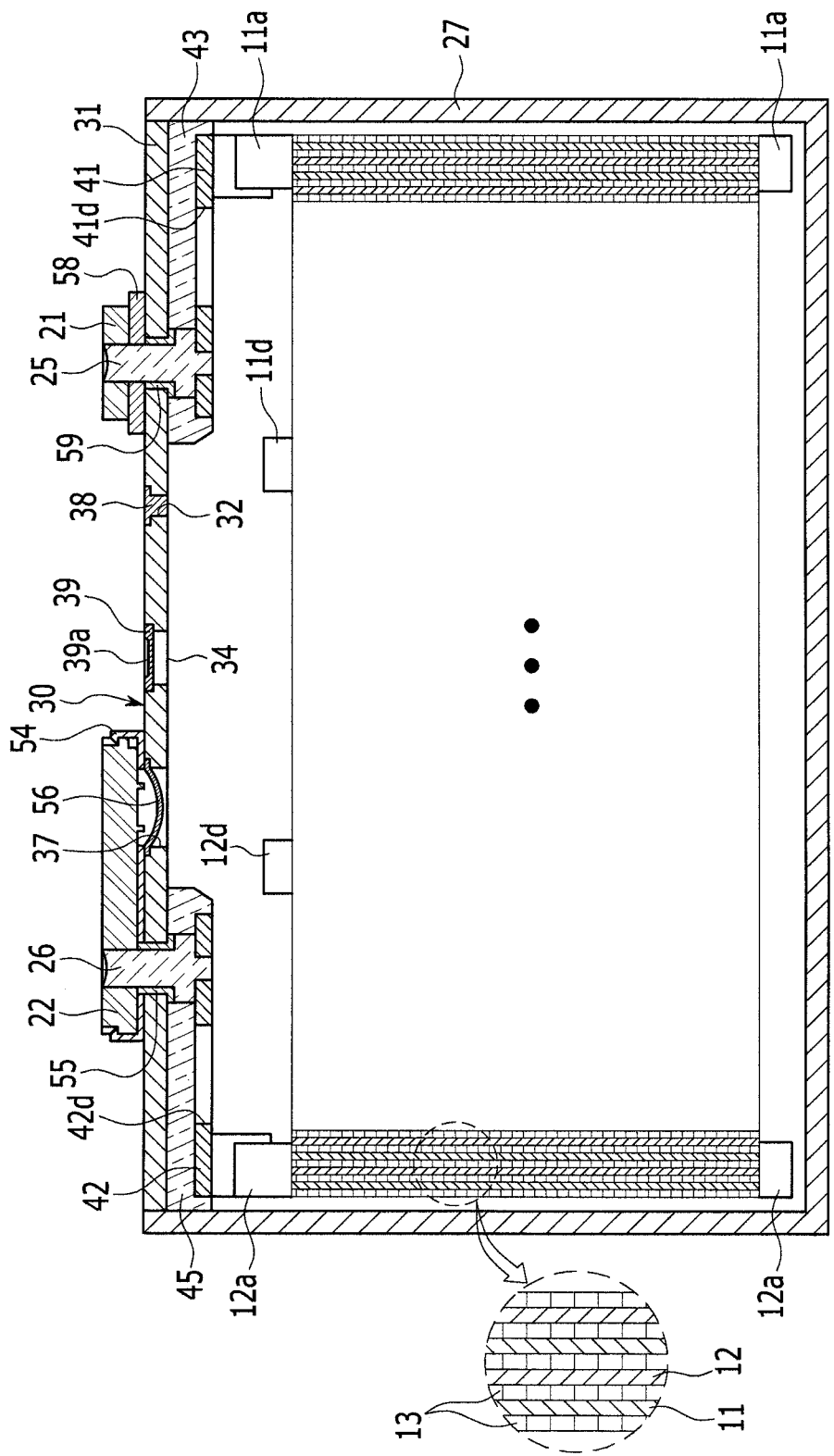
FIG. 2 is a cross-sectional view of FIG. 1, taken along the line II-II.

FIG. 2 is a cross-sectional view of FIG. 1, taken along the line II-II.

Referring to FIG. 2, the first terminal 21 may be electrically connected with the first electrode through a first current collecting member 41, and the second terminal 22 may be electrically connected with the second electrode 12 through a second current collecting member 42.

The first terminal 21 is electrically connected with the first electrode 11 through the connection terminal 25 connected to the first current collecting member 41. Further, the connection terminal 25 is fixed to the first current collecting member 41 by welding, and the first current collecting member 41 electrically connects the connection terminal 25 and the first electrode 11. A sealing gasket 59 is inserted into a hole through which the connection terminal 25 penetrates for sealing between the first terminal 21 and the cap plate 31, and a lower insulation member 43 may be provided to support the first current collecting member 41 below the cap plate 31.

The second terminal 22 is electrically connected with the second electrode 12 through the connection terminal 26 connected to the second current collecting member 42. Further, an upper end of the connection terminal 26 is fixed to the second current collecting member 42 by welding, and the second current collecting member 42 may electrically connect the connection terminal 26 and the second electrode 12. A sealing gasket 55 is inserted into a hole through which the second terminal 22 is penetrated for sealing between the second terminal 22 and the cap plate 31, and a lower insulation member 45 may be provided below the cap plate 31 for insulation of the second terminal 22 and the second current collecting member 42 in the cap plate 31.

Further, a short-circuit protrusion protruded toward a short-circuit hole 37 may be formed in a lower portion of the second terminal 22. The second terminal 22 is extended in a direction to cover the short-circuit hole 37, and the upper insulation member 54 that electrically insulates the second terminal 22 and the cap plate 31 may be provided between the second terminal 22 and the cap plate 31.

The cap assembly 30 may include a short-circuit member 56 configured to short-circuit the first electrode 11 and the second electrode 12 under certain conditions. The short-circuit member 56 is electrically connected with the cap plate 31, and when an internal pressure of the rechargeable battery 101 is increased, the short-circuit member 56 is deformed and thus may be connected with the second terminal 22. The short-circuit hole 37 is formed in the cap plate 31, and the short-circuit hole 37 may be provided between the upper insulation member 54 and the cap plate 31. The short-circuit member 56 may include an arc-shaped bent portion that is convex downward (i.e., towards the electrode assembly) and an edge portion provided in an outer side of the bent portion and fixed to the cap plate 31. Accordingly, when a gas is generated due to an abnormal reaction in the rechargeable battery 101 and thus internal pressure of the rechargeable battery 101 is increased to be higher than a predetermined pressure, the bent portion is deformed to be convex upward such that the short-circuit protrusions and the short-circuit member 56 contact each other, thereby causing a short-circuit.

A jelly-roll type of electrode assembly 10 may be formed by spirally winding the first electrode 11, the separator 13, and the second electrode 12 with respect to a rotation axis X1, while interposing the separator 13 between the first electrode 11 and the second electrode 12. A first electrode tab 11a and a second electrode tab 12a may be provided in an outer side of the electrode assembly 10 and thus may be connected with the first current collecting member 41 and the second current collecting member 42, respectively.

A first protrusion tab 11d may be provided between the rotation axis X of the electrode assembly 10 and the first electrode tab 11a, and a second protrusion tab 12d may be provided between the rotation axis X1 and the second electrode tab 12a. In one embodiment, each of the first and second protrusion tabs 11d and 12d may protrude in the shape of a rectangle in a direction of the cap assembly 30. The first protrusion tab 11d and the second protrusion tab 12d are provided in one side of the electrode assembly 10 and are not connected with either the first current collecting member 41 or the second current collecting member 42, and may fix the electrode assembly 10 in a short side S (refer to FIG. 3) thereof so as to prevent the electrode assembly 10 from being swelled.

Figure 3:
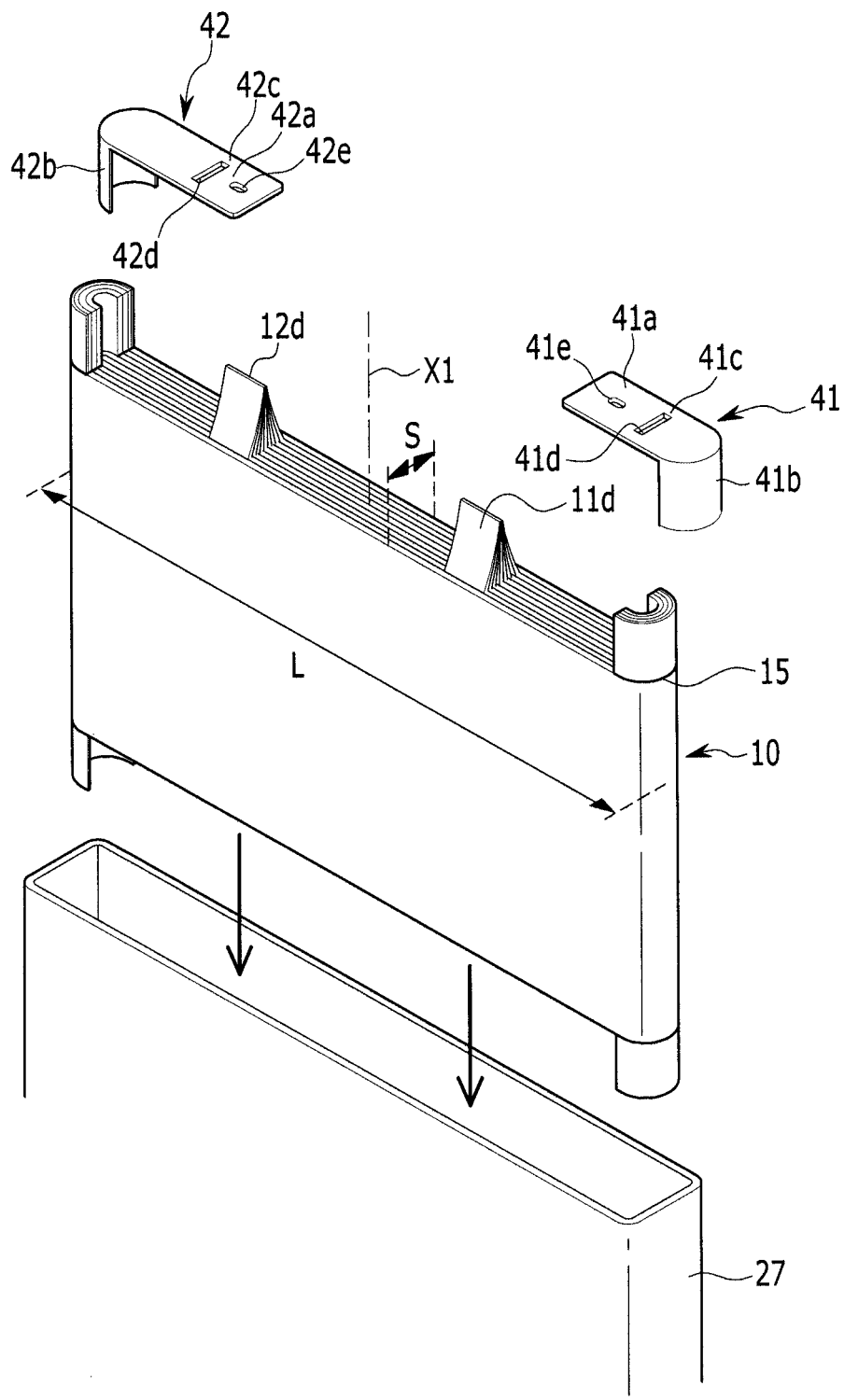
FIG. 3 is an exploded perspective view of the rechargeable battery according to the exemplary embodiment of the present invention.

FIG. 3 illustrates an exploded perspective view of the electrode assembly of the rechargeable battery according to the exemplary embodiment of the present invention.

Referring to FIG. 3, the first current collecting member 41 connected with the first electrode 11 may include an upper plate 41a combined to the connection terminal 25 (refer to FIG. 2) and an electrode combining portion 41b facing toward the electrode assembly 10 from the upper plate 41 a and combined to the first electrode tab 11a (refer to FIG. 2). The second current collecting member 42 connected with the second electrode 12 may be formed substantially the same as the first current collecting member 41. Thus, hereinafter, the first electrode 11 and the first current collecting member 41 will be exemplarily described. The electrode combining portion 41b may be bent corresponding to the shape of the first electrode tab 11a at an end of the upper plate 41a, i.e., it may have a matching contour to the first electrode tab. Since the first electrode tab 11a is combined with the electrode combining portion 41b, even if swelling occurs in a rounded portion 15 of the electrode assembly 10, the shape of the first electrode tab 11a can be maintained, thereby preventing the electrode assembly 10 from being deformed. The upper plate 41a of the first current collecting member 41 is formed in the shape of a quadrangular plate, and may be fixed to the connection terminal 25 by welding. A combining hole 41e is formed in the upper plate 41a, and the connection terminal 25 and the upper plate 41a may be welded to each other while a protrusion formed in the connection terminal 25 is fitted into the combining hole 41e. A fuse 41c having a smaller cross-section than the peripheral area is formed in the upper plate 41a. A fuse hole 41d is formed in the fuse 41c and thus a longitudinal cross-section of the fuse 41c is less than the peripheral area. The fuse hole 41d is provided in the center of the fuse 41c and the fuse 41c is provided at lateral ends of the fuse hole 41d.

The first electrode tab 11a and the second electrode tab 12a extending parallel to the electrode assembly may be provided in the electrode assembly 10.

The electrode assembly 10 is spirally wounded and then pressed such that the shape of the electrode assembly 10 may be a flat oval, i.e., generally ovular with flat sides. Thus, the oval-shaped electrode assembly 10 has a long side L and the short side S, and rounded portions 15 may be formed at lateral ends of the electrode assembly 10.

The first electrode tab 11a and the second electrode tab 12a may be separated from each other and thus respectively provided in the rounded portions 15 of the electrode assembly 10. The first electrode tab 11a and the second electrode tab 12a may be rounded along the rounded portions 15. Hereinafter, the first electrode tab 11a will be exemplarily described.

A plurality of first electrode tabs 11a may be formed in the first electrode 11. The plurality of first electrode tabs 11a may be formed by stamping an uncoated portion of the first electrode 11. The plurality of first electrode tabs 11a are formed of a first electrode tab 11a located at the outermost side of the electrode assembly 10 and a first electrode tab 11a provided in an inner side of the electrode assembly 10. The first electrode tab 11a located at the outermost side in the rounded portion 15 of the electrode assembly 10 and the first electrode tab 11a located at the inner side of the electrode assembly 10 may be welded to each other and thus electrically connected with each other. Further, the plurality of first electrode tabs 11a are rounded along the rounded portions 15, and a width of the first electrode tab 11a at the outermost side may be larger than a width of the first electrode tab 11a located at the inner side of the electrode assembly 10. Thus, in one embodiment, the first electrode tabs 11a are welded to each other while the first electrode tab 11a located at the outermost side surrounds the plurality of electrode tabs 11 located at the inner side of the electrode assembly such that the plurality of first electrode tabs 11 can serve as a single structure. In other words, the first electrode tabs 11a may be rounded like the letter "C" along the rounded portion 15 and nested with each other to form a singular structure.

The first electrode tab 11a extends vertically along a side of the battery as defined in FIG. 3 and thus strongly holds the electrode assembly 10 at the side thereof.

Further, the plurality of first electrode tabs 11a are welded to each other so as to prevent the electrode assembly 10 from being swelled with the welding force.

The first electrode tab 11a connected with the electrode combining portion 41b can effectively suppress the swelling of the electrode assembly 10. The second electrode tab 12a is separated from the first electrode tab 11a, and may be formed symmetrically to the first electrode tab 11a in the other rounded portion 15, centering the rotation axis X1.

The first protrusion tab 11d may be provided between the rotation axis X1 of the electrode assembly 10 and the first electrode tab 11a. The first protrusion tab 11d may be shorter than the first electrode tab 11a in length. The first protrusion tab 11d may not be connected with the first current collecting member 41. The first protrusion tab 11d is provided to prevent swelling of the electrode assembly 10. Like the first electrode tab 11a, the first protrusion tab 11d may protrude to the outside of the first electrode 11 from the cap plate. The plurality of first protrusion tabs 11d are welded to each other and thus fix the electrode assembly 10 in the direction of the short side S such that the electrode assembly 10 can be prevented from being swelled.

As described above, swelling of the electrode assembly 10 is robust in the direction of the long side L. Thus, the swelling of the electrode assembly 10 may not be sufficiently prevented only using the first electrode tabs 11a and the second electrode tab 12a formed in the rounded portions 15. Accordingly, the first protrusion tabs 11d and the second protrusion tab 12d are formed in the long side L of the electrode assembly 10 to strongly engage the electrode assembly 10.

Figure 4:
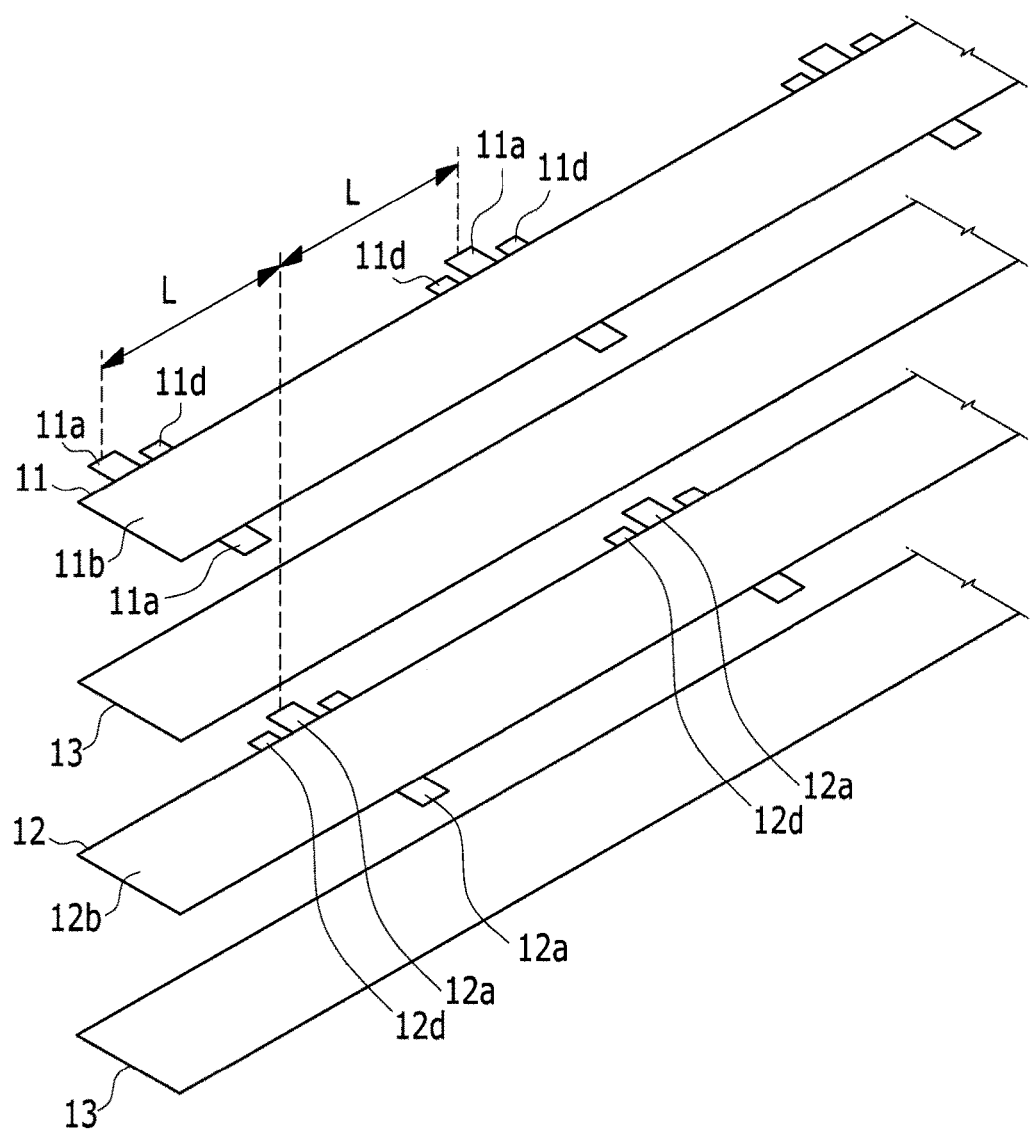
FIG. 4 is a schematic perspective view of an electrode assembly applied to the rechargeable battery of FIG. 3.

FIG. 4 illustrates a schematic perspective view of an electrode assembly applied to the rechargeable battery of FIG. 3.

Referring to FIG. 4, a plurality of first electrode tabs 11a are formed in a first electrode 11 and the first electrode tabs 11a may protrude in a first direction, in this embodiment, from lateral edges of the first electrode. The plurality of first electrode tabs 11a may be located at a distance from each other with a gap of a long side L in a length direction of the first electrode 11. When a jelly-roll type of electrode assembly 10 is formed, the gap between the first electrode tabs 11a can be adjusted to locate the first electrode tabs 11a in the rounded portions 15 of the electrode assembly 10.

The gap between the first electrode tabs 11a may be gradually increased toward the outer side of the first electrode 11 from an inner front end of the first electrode 11 so that the tabs align when the electrode assembly is wound. In this case, the gap between the first electrode tabs 11 a refers to a distance between centers of neighboring first electrode tabs 11a that are distanced along the length direction of the first electrode 11. Thus, a gap between the first electrode tab 11a, which is the first electrode tab at the inner side, and the second first electrode tab 11a may be smaller than a gap between the second first electrode tab 11a and the third first electrode tab 11a.

The width of the first electrode tab 11a, which is the first electrode tab in the first electrode 11, is wider than the width of the last first electrode tab 11a. Thus, the last first electrode tab 11a may be rounded along the rounded portion 15 at the outermost side of the rounded portion 15 of the electrode assembly 10. The length protruding upward of the first electrode tab 11a may be longer than the length protruding downward of the first electrode tab 11a. Such a length difference is because the upper first electrode tab 11a is configured to be connected through the first current collecting member 41 and the electrode combing portion 41b, but the lower first electrode tab 11a prevents swelling of the electrode assembly 10. The electrode assembly 10 can be separated from the case 27 by the lower first electrode tab 11a.

A first protrusion tab 11d may be formed between the first electrode tabs 11a. When the first electrode 11 is unfolded, the length of the first protrusion tab 11d disposed in an inner front end of the first electrode 11 and the length of the last first protrusion tab 11d may be different from each other. The length of the last first protrusion tab 11d may be longer than the length of the first first protrusion tab 11a, which is the first protrusion tab at the inner front end of the first electrode 11.

Since the second electrode tab 12a is distanced from the first electrode tab 11a, a location of the second electrode tab 12a become different from the location of the first electrode tab 11a when the second electrode 12 is unfolded in the planar view. The second electrode tab 12a is formed at a location that is changed when spiral winding is being performed.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

| Description of symbols | |
| --- | --- |
| 101: rechargeable battery | 10: electrode assembly |
| 15: rounded portion | 11: first electrode |
| 11a: first electrode tab | 11b: first coated portion |
| 11d: first protrusion tab | 12: second electrode |
| 12a: second electrode tab | 12b: second coated portion |
| 12d: second protrusion tab | 13: separator |
| 21: first terminal | |
| 22: second terminal | 25, 26: connection terminal |
| 27: case | 30: cap assembly |
| 31: cap plate | 32: electrolyte injection opening |
| 34: vent hole | 37: short-circuit hole |
| 38: sealing stopper | 39: vent plate |
| 41: first current collecting member | |
| 42: second current collecting member | |
| 41a, 42a: upper plate | 41b, 42b: electrode combining portion |
| 41c, 42c: fuse | 41d, 42d: fuse hole |
| 41e, 41e: combining hole | 43, 45: lower insulation member |
| 54: upper insulation member | 55, 59: sealing gasket |
| 56: short-circuit member | 58: connection member |
| X1: rotation axis | L: long side |
| S: short side | |

What is claimed is:

1. A rechargeable battery comprising:
   a wound electrode assembly comprising a first electrode and a second electrode with a separator located between the first electrode and the second electrode, wherein the electrode assembly defines a rotation axis about which it has been wound and wherein lateral ends of the electrode assembly define rounded portions;
   a case accommodating the electrode assembly; and
   a cap assembly coupled to the case and including a first terminal and a second terminal,
   wherein the first electrode comprises a plurality of first electrode tabs extending parallel with the rotation axis and including an upper first electrode tab protruding upward from an upper edge of the first electrode and a lower first electrode tab protruding downward from a lower edge of the first electrode, wherein the second electrode comprises a plurality of second electrode tabs extending parallel with the rotation axis and including an upper second electrode tab protruding upward from an upper edge of the second electrode and a lower second electrode tab protruding downward from a lower edge of the second electrode, and wherein the plurality of first electrode tabs and the plurality of second electrode tabs are separated from each other and located in the rounded portions, and
   wherein a length by which the upper first electrode tab of the plurality of first electrode tabs protrudes from the upper edge of the first electrode is different from a length by which the lower first electrode tab of the plurality of first electrode tabs protrudes from the lower edge of the first electrode.

2. The rechargeable battery of claim 1, wherein the first electrode comprises a first protrusion tab extending between the rotation axis of the electrode assembly and the plurality of first electrode tabs.

3. The rechargeable battery of claim 1, wherein the second electrode comprises a second protrusion tab extending between the rotation axis of the electrode assembly and the plurality of second electrode tabs.

4. The rechargeable battery of claim 1, wherein the upper first electrode tab is electrically connected with the first terminal through a first current collecting member, wherein the upper second electrode tab is electrically connected with the second terminal through a second current collecting member,
- wherein the first current collecting member and the second current collecting member each comprises an electrode combining portion that contacts the upper first electrode tab and the upper second electrode tab, respectively, and
- wherein the electrode combining portions have a matching contour to the upper first and second electrode tabs, respectively.

5. The rechargeable battery of claim 2 wherein the first protrusion tab is provided in plural and the plurality of first protrusion tabs are connected to each other by welding.

6. The rechargeable battery of claim 3, wherein the second protrusion tab is provided in plural and the plurality of second protrusion tabs are connected to each other by welding.

7. An electrode assembly comprising:
- a first electrode including a first coated portion being coated with an active material and a plurality of first electrode tabs absent the active material and including an upper first electrode tab extending upward from an upper edge of the first electrode and a lower first electrode tab extending downward from a lower edge of the first electrode;
- a second electrode including a second coated portion being coated with an active material and a plurality of second electrode tabs absent the active material and including an upper second electrode tab extending upward from an upper edge of the second electrode and a lower second electrode tab extending downward from a lower edge of the second electrode; and
- a separator located between the first electrode and the second electrode, the first electrode, the separator, and the second electrode being spirally wound together with respect to a rotation axis to define rounded portions,
- wherein the plurality of first electrode tabs and the plurality of second electrode tabs are separated from each other and located in the rounded portions, and
- wherein a length by which the upper first electrode tab of the plurality of first electrode tabs protrudes from the upper edge of the first electrode is different from a length by which the lower first electrode tab of the plurality of first electrode tabs protrudes from the lower edge of the first electrode.

8. The electrode assembly of claim 7, wherein the first electrode comprises a first protrusion tab located between the rotation axis and the plurality of first electrode tabs.

9. The electrode assembly of claim 7, wherein the second electrode comprises a second protrusion tab located between the rotation axis and the plurality of second electrode tabs.

10. The electrode assembly of claim 8, wherein a length of the first protrusion tab is less than a length of the upper first electrode tab.

11. The electrode assembly of claim 9, wherein a length of the second protrusion tab is less than a length of the upper second electrode tab.

* * * * *